March 11, 1952 N. T. DAVIS 2,588,706
DISAPPEARING TABLE FOR AUTOMOBILE INSTRUMENT PANELS
Filed March 2, 1950 2 SHEETS—SHEET 1

Neuman T. Davis
INVENTOR.

BY Clarence A. O'Brien
and Harvey B. Jackson
Attorneys

March 11, 1952 N. T. DAVIS 2,588,706
DISAPPEARING TABLE FOR AUTOMOBILE INSTRUMENT PANELS
Filed March 2, 1950 2 SHEETS—SHEET 2
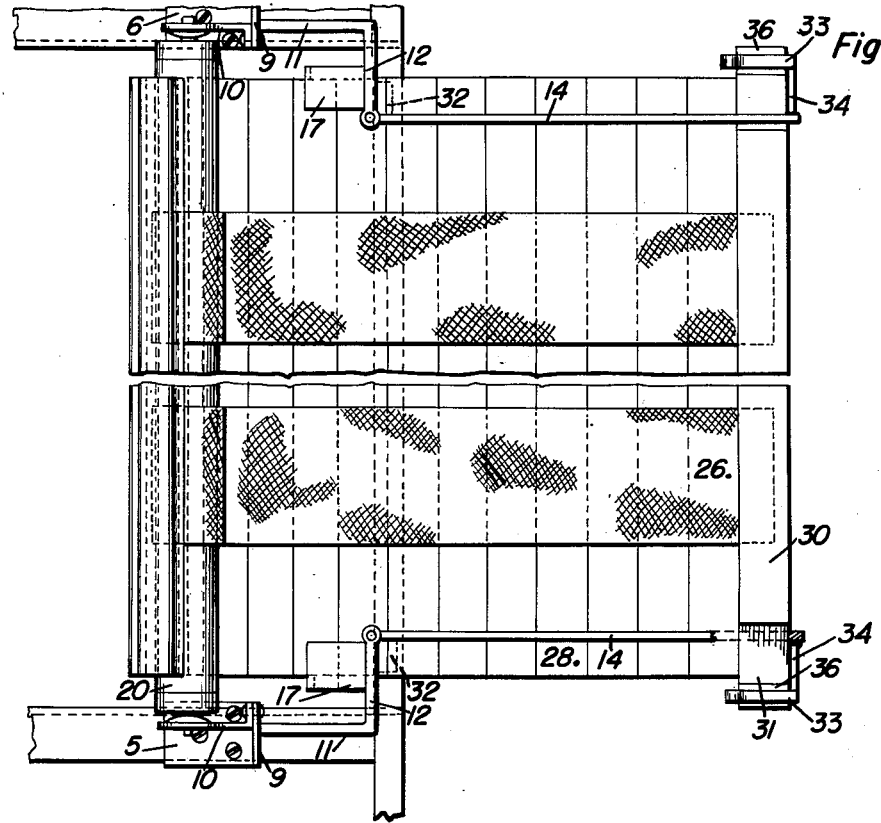
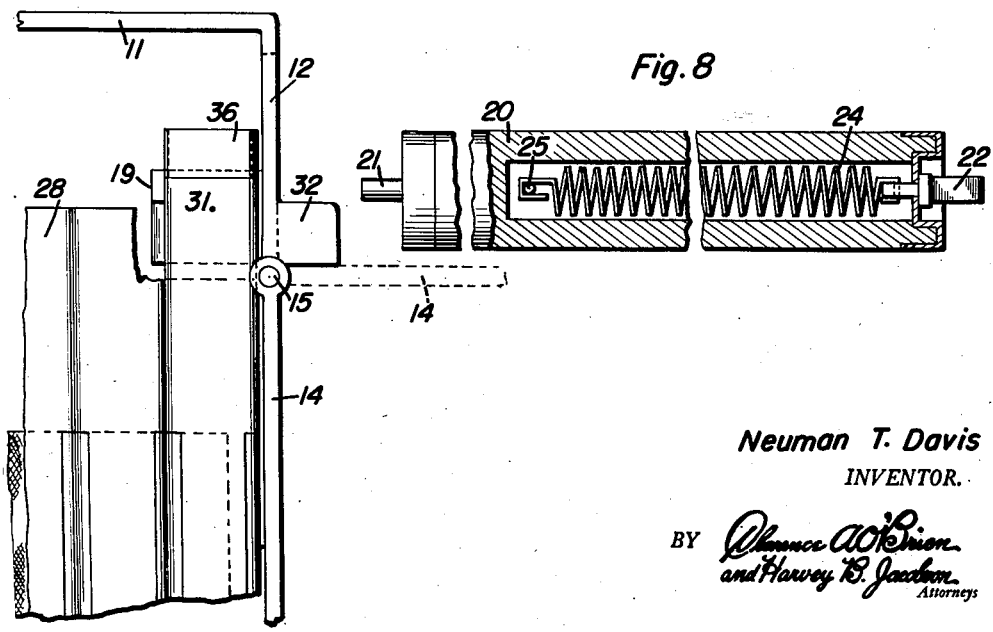
Neuman T. Davis
INVENTOR.

Patented Mar. 11, 1952

2,588,706

UNITED STATES PATENT OFFICE 2,588,706

DISAPPEARING TABLE FOR AUTOMOBILE INSTRUMENT PANELS

Neuman T. Davis, Plainview, Tex.

Application March 2, 1950, Serial No. 147,258

3 Claims. (Cl. 311—21)

The present invention relates to new and useful improvements in tables for use in automobiles, and more particularly to a disappearing table mounted under the instrument panel of an automobile whereby the table may be moved from a concealed position under the instrument panel to an open position in front of the instrument panel.

An important object of the invention is to provide a flexible table composed of slats connected to each other by flexible tapes for rolling on a spring roller mounted under the instrument panel.

Another object of the invention is to provide foldable supporting arms for rigidly holding the table in its open position.

A still further object is to provide a device of this character of simple and practical construction, which is strong and durable, neat and attractive in appearance, which may be easily and quickly attached in position to an automobile without necessitating any changes or alterations in the construction thereof, and which is otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a top plan view;

Figure 4 is an enlarged fragmentary top plan view showing the table in its closed or concealed position;

Figure 8 is an enlarged longitudinal sectional view of the spring roller.

Figure 1:
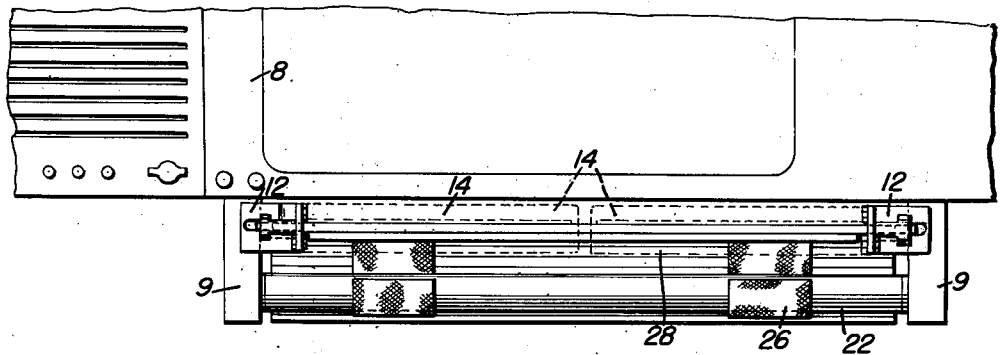
Figure 1 is a front elevational view.
Figure 2:
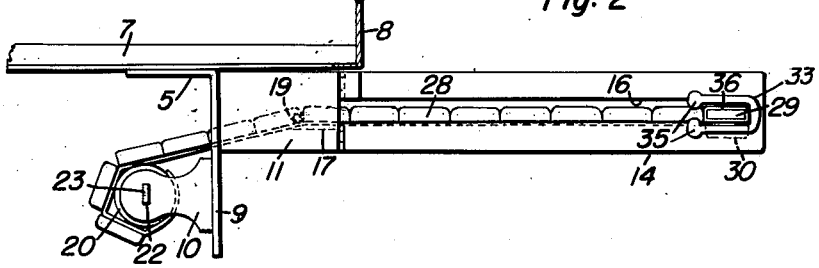
Figure 2 is a side elevational view with parts shown in section.
Figure 5:
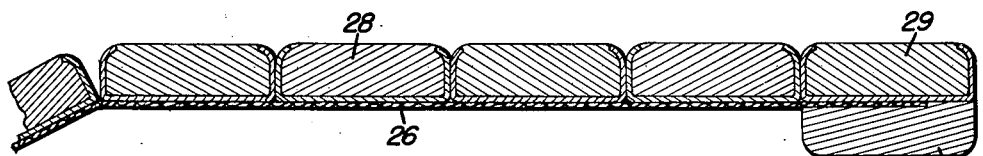
Figure 5 is a longitudinal sectional view of the flexible table.
Figure 7:
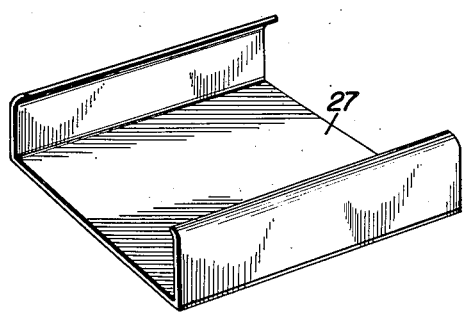
Figure 7 is an enlarged perspective view of one of the channel members for attaching the slats to the flexible tape.
Figure 6:
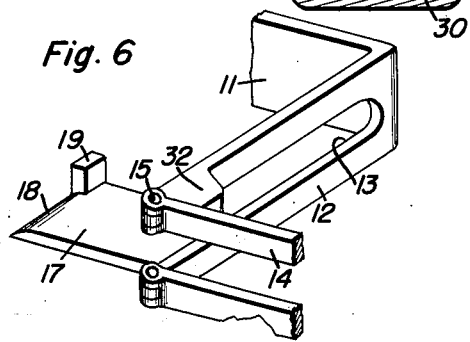
Figure 6 is an enlarged fragmentary perspective view of one of the guide brackets for the side of the table.

Referring now to the drawings in detail, wherein, for the purpose of illustration, I have disclosed a preferred embodiment of the invention, the numerals 5 and 6 designate a pair of attaching brackets suitably secured to the usual frame structure 7 at the under side of the instrument panel 8 of an automobile. Each bracket is of substantially duplicate construction and, accordingly, a detailed description of one will will suffice for both.

Each bracket includes a downwardly extending leg 9 provided at its rear with a shade roller supporting bracket 10 and with a rigid table supporting arm 11 projecting forwardly from the leg 9 and formed with a transversely extending front end 12 positioned adjacent the front edge of the instrument panel 8. The front end or arm 12 is formed with a slot 13 which extends through the free end of said arm and to which a folding table supporting arm 14 is pivotally attached at one end by hinge pins 15. Folding arm 14 is formed with a longitudinal slot 16 which extends through the pivoted end of the folding arm and which is closed at the free or outer end of the folding arm.

A rearwardly projecting guide plate 17 is carried by transverse arm 12 adjacent its free end and substantially in the plane of the lower edge of slot 13, the rear edge of guide plate 17 being beveled or sloping, as shown at 18, and a stop 19 rises from the rear outer side edge of plate 17.

A spring roller 20 is supported at its ends in bracket 10, the roller being of a conventional shade roller type except for the omission of the usual locking dogs or catches, and the roller is provided with a fixed trunnion 21 at one end for rotatably supporting one end of the roller in one of the brackets 10 and a square-shaped pin 22 at its other end which is anchored in a slot 23 of one of the brackets 10. Spring 24 for the roller is anchored at one end to the roller as shown at 25 and its other end is secured to the pin 22.

A pair of flexible tapes 26 are cemented or otherwise suitably secured at one end to roller 20 and the tapes are also cemented or otherwise suitably secured to the bottom of channels 27 in which slats 28 are secured, the tapes 26 winding the slats on roller 20.

The outermost slat 29 is provided at its under side with a second slat 30 to provide the end slat of double thickness and which forms a finger grip for the ends of the slats. The endmost slat 29 is also constructed of a length slightly greater than the remaining slats 28 to project outwardly at each end of the slat 28 to form stops 31. Stops 32 on arms 12 limit outward swinging movement of arms 14.

In the operation of the device, the assembled slats 28 and 29 form a flexible table for rolling on roller 20.

When the table is in its concealed position under the instrument panel 8 and rolled on roller 20, the foldable arms 14 are swung inwardly toward each other under the front edge of the instrument panel and ends 31 of endmost slat 29 strike stops 19 to hold the slat 29 behind the folded arms.

To move the table in open position, arms 14 are swung forwardly in parallel relation to each other, as shown in Figure 3, and slats 29 and 30 grasped to pull the slats outwardly, the ends of the slats riding over guide plates 17 to guide the ends of the slats through slot 13 of fixed arms 12 and through slots 16 of foldable arms 14.

A resilient U-shaped catch 33 is secured to the outer end of each arm 14 by a bracket 34 with the legs of the catch pointing rearwardly, one above the other, to receive the outer ends 31 of slat 29. Opposed jaws 35 are formed at the ends of the legs of the catch to grip the edge of slat 29 to hold the table in its open position. The ends 31 of slat 29 are covered by a metal tip 36 to reduce wear by frequent contact with jaws 35.

Having described the invention, what is claimed as new is:

1. A disappearing automobile table comprising a flexible top constructed of rigid slats and a flexible tape connecting the slats to each other, brackets adapted for attaching under the instrument panel of an automobile, a spring roller mounted in the brackets and connected to one end of the top for winding thereon, and foldable arms pivoted to the brackets and swingable horizontally into and out of a forwardly projecting position in spaced parallel relation to each other, said arms having longitudinal slots slidably supporting the side edges of the top.

2. A disappearing automobile table comprising a flexible top constructed of rigid slats and a flexible tape connecting the slats to each other, brackets having means for attaching under the instrument panel of an automobile, a spring operated roller mounted in the brackets and connected to one end of the top for winding the top thereon, and foldable arms pivoted to the brackets and swingable horizontally into and out of a forwardly projecting position in spaced parallel relation to each other, said arms having longitudinal slots slidably supporting the side edges of the top and catch means holding the top in open position.

3. The construction recited in claim 1 together with means for holding the top in an open position, said holding means including a resilient U-shaped catch secured to the outer end of one of said foldable arms and having legs located one above the other to receive the outer end of the end slat and to frictionally hold said end slat.

NEUMAN T. DAVIS.

REFERENCES CITED

The following references are of record in the file of this patent:

UNITED STATES PATENTS

| Number | Name | Date |
|---|---|---|
| 419,978 | Taylor | Jan. 21, 1890 |
| 508,938 | Hamilton | Nov. 21, 1893 |
| 1,250,487 | Nealy | Dec. 18, 1917 |
| 1,433,741 | Parker | Oct. 31, 1922 |
| 1,566,200 | Giard | Dec. 15, 1925 |
| 1,743,406 | Stone | Jan. 14, 1930 |
| 1,759,977 | Denton | May 27, 1930 |
| 1,877,401 | Hildebrand | Sept. 13, 1932 |
| 2,038,838 | Greyson | Apr. 28, 1936 |
| 2,270,557 | Randall | Jan. 20, 1942 |